Dec. 23, 1969   R. V. BEZ   3,486,026
INFRARED DETECTOR SYSTEM WITH PRECESSING OPTICAL SEARCHER
Filed Oct. 2, 1957   3 Sheets-Sheet 1

INVENTOR.
ROBERT V. BEZ.
BY Alden D. Redfield
Irwin P. Garfinkle
ATTORNEYS.

INVENTOR.
ROBERT V. BEZ.
BY Alden D. Redfield
Irwin P. Garfinkle
ATTORNEYS.

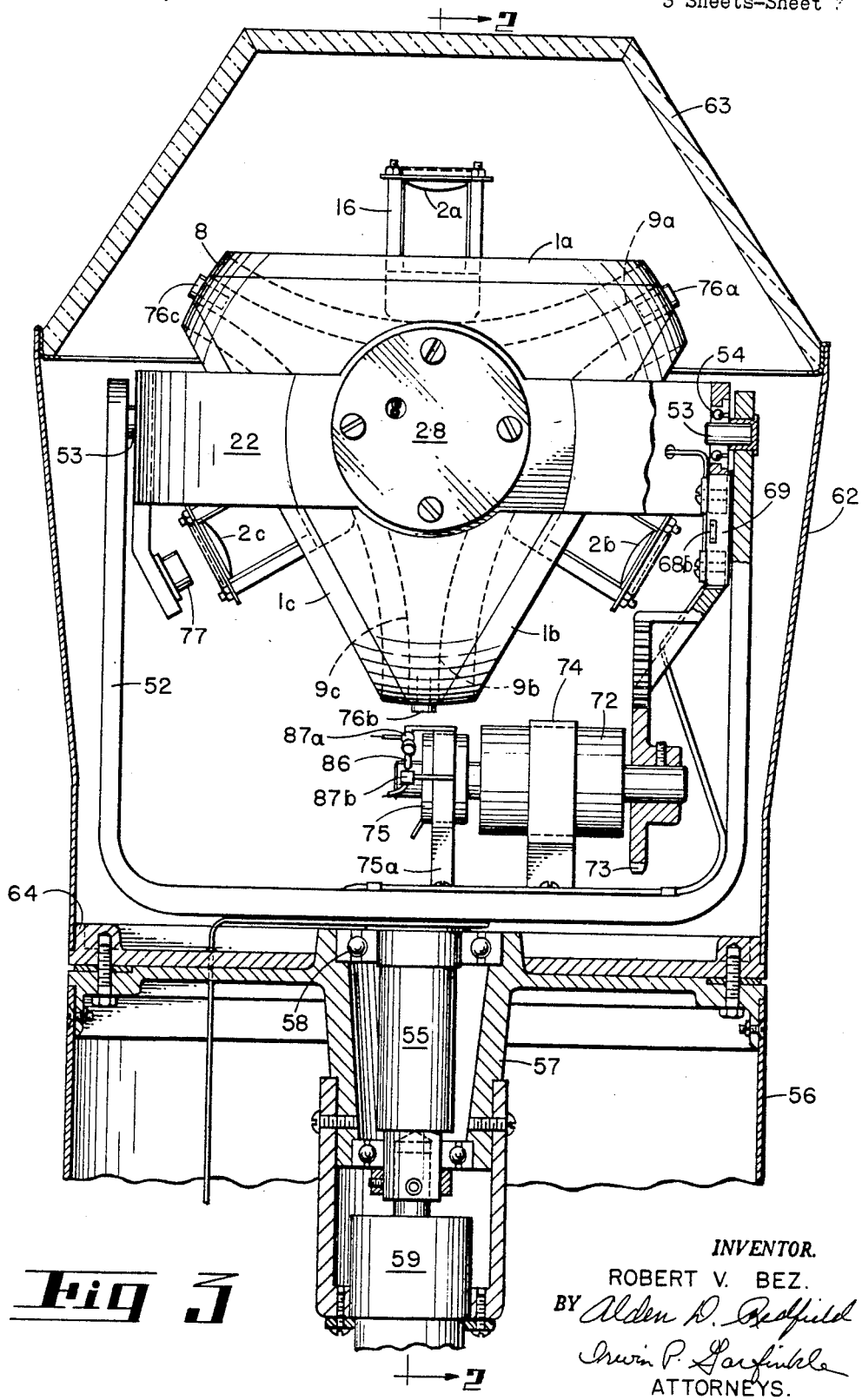

United States Patent Office 3,486,026
Patented Dec. 23, 1969

3,486,026
INFRARED DETECTOR SYSTEM WITH PRECESSING OPTICAL SEARCHER
Robert V. Bez, Cincinnati, Ohio, assignor to Avco Manufacturing Corporation, Cincinnati, Ohio, a corporation of Delaware
Filed Oct. 2, 1957, Ser. No. 687,666
Int. Cl. G01t 1/16
U.S. Cl. 250—83.3                    17 Claims This invention relates to a system for detecting the presence and location of objects in space and, more particularly, to a passive optical system which is sensitive to infrared radiation.

In my copending application entitled "Infrared Detector System," Ser. No. 666,278, filed June 13, 1957, I disclosed an optical searchhead having a rectilinear television-type scan for searching an area in space for targets radiating infrared energy. The rectilinear-type scan was accomplished without flyback by means of three sets of optics spaced 120° apart on a horizontal spin shaft for rotation at a high rate of speed, the spin shaft being mounted for oscillatory motion at a much slower rate of speed on a vertical scan shaft. Rapid rotation on the spin shaft was produced by a spin motor, while the slower rotation on the vertical axis was provided by means of a scan motor. In actual operation, the optical sets rotate at a rate of 120 revolutions per second, and I pointed out in the aforesaid copending application that, in addition to several other advantages, the rotating mass of optics becomes, in effect, a gyroscope.

One of the advantages of the gyroscopic effect of the rotating optics is that the rotational velocity of the optical assembly is maintained constant, irrespective of short-term angular movements of the system. Another advantage is that the optical assembly tends to be self-stabilized. Further, advantage may also be taken of the gyroscopic effect of the optical sets by eliminating the scan motor and by utilizing the precessional characteristics of the gyroscope to produce the required scan.

The primary object of this invention is to provide improved optical apparatus taking advantage of the gyroscopic effects of the rotating optical assembly disclosed in the aforesaid copending application.

Another object of this invention is to provide a rectilinear television-type scan for a rotating optical search apparatus by causing the apparatus to gyroscopically precess through predetermined angles.

Still another object of this invention is to provide apparatus for precessing an optical searchhead which is rapidly rotating on a gimballed shaft.

Another object of this invention is to provide apparatus for precessing a rotating optical assembly and for relieving said assembly of residual torque on the precessing axis due to wiring, etc.

A further object of this invention is to provide for the precessing axis of a rotating optical assembly a position-follow-up device which does not load said axis.

For a more complete understanding of the nature and further objects of this invention, reference should now be made to the following detailed description and to the accompanying drawings, in which:

FIG. 3 is a side view of the invention, partly in section; and

Figure 1:
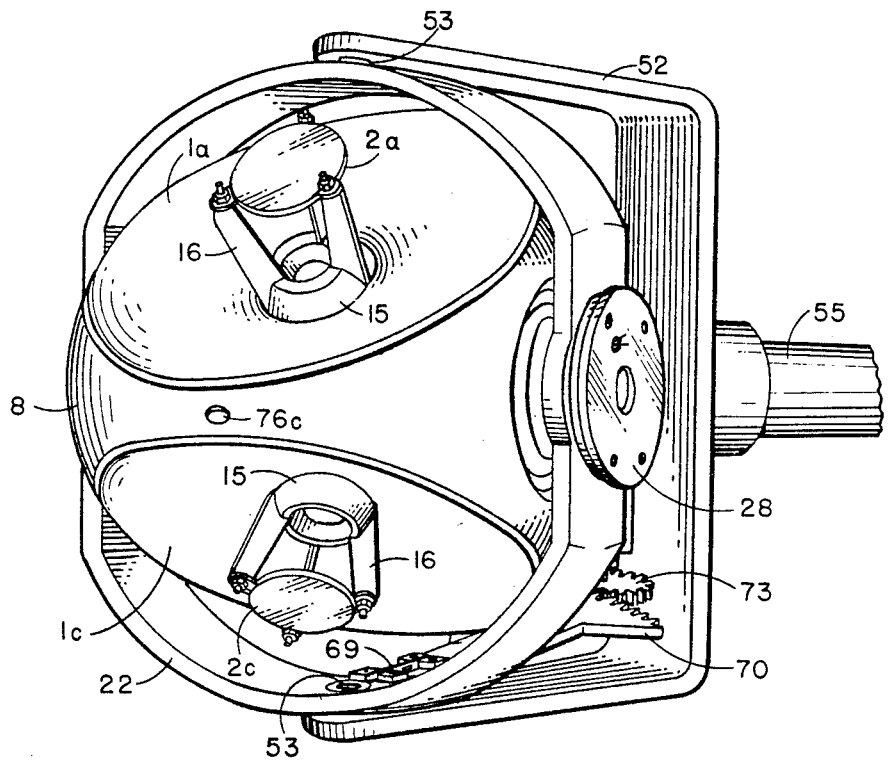
FIG. 1 is a perspective view of a preferred embodiment of my invention.

Briefly stated, the invention comprises an optical searchhead suitably mounted on an aircraft. The searchhead consists of three reflectors rotatably mounted 120° apart on a spin axis, each reflector being arranged to sweep in turn a 120° sector, i.e., as one reflector has swept and is about to leave the sector, the next reflector is about to enter the sector at the opposite side. The optical head is supported for rotation on its spin axis from a gimbal ring, and is driven by an electric motor. The gimbal ring is, in turn, freely rotatable on a scan axis positioned at right angles to the spin axis, and is supported from a yoke. The yoke is mounted on a constrained shaft which is mutually perpendicular to the spin axis and the scan axis. Generally, though not necessarily, when used on aircraft the spin shaft is mounted parallel to the aircraft pitch axis to provide a rapid vertical line sweep; the scan axis is mounted parallel to the yaw axis, and the yoke shaft is mounted parallel to the roll axis.

Since the reflectors have mass, a gyroscopic effect is produced by the rapid spinning of the reflectors, and rotation of the gimbal ring on the scan axis is accomplished by applying torque (not rotation) to the shaft of the yoke, thus taking advantage of one of the characteristics of a gyroscope and causing the reflectors to precess. By periodically reversing the torque on the yoke shaft, the optical assembly reversibly precesses at a rate of speed depending on the amount of torque applied; and the combination of the rapid spin and the slower precessing produces the desired rectilinear television-type scan. Further, the gyroscopic effect permits realization of complete space stabilization.

Referring to the drawings, it is seen that the optical searchhead includes a system of three parabolic mirrors 1a, 1b and 1c mounted 120° apart for rotation on a horizontal spin axis. Rays of infrared energy detected by the parabolic mirrors 1 are focused onto a system of cooperating mirrors 2, the respective mirrors being designated 2a, 2b and 2c, and then focused through centrally located corresponding apertures in the parabolic mirrors to a deflecting prism 4. From there the rays are directed past a chopper grid 5 and through a conventional Ramsden lens 6 onto an infrared photodetector cell 7 to produce an indicating electric current. Although I illustrate a system of reflectors, it is to be understood that a properly designed refractive system may also be employed. Further, while infrared photodetector cells are preferred for use under certain operating conditions, particularly for military aircraft, many other types of detector cells may be employed, and the system may very well be designed for visual optics. Depending on the specific use of the system, many types of infrared photodetector cells may be used. For use as an aircraft detection device, sensitivity of 3 to 5 microns is desirable. Weighing the sensitivity of the various infrared photodetector cells against wave length and time constants, cells comprised of indium antimonide and gold-doped germanium have been employed with considerable success.

The support for the mirrors 1 and 2 and the other spinning optical apparatus, including the prism 4 and the chopper grid 5, consists of a spin assembly mounting 8 made from a solid sphere of aluminum or other non-magnetic material from which has been machined appropriate surfaces and voids for containing the various elements. Thus, the outer surface of the mounting 8 has been machined to provide parabolic dished portions 9a, 9b and 9c having central shoulders 10a, 10b and 10c for receiving and retaining the parabolic mirrors 1a, 1b and 1c, respectively. The back surfaces of the mirrors may be cemented to the respective parabolic portions to provide a permanent mounting, or the mirrors may be appropriately clamped. Preferably, the mirrors are top-surfaced with gold or other bright, non-corrosive metal.

The spin assembly mounting 8 is bored at both sides of its horizontal spin axis; i.e., its axis is transverse to the line of sight of the mirrors 1, to provide chambers 11 and 12 with a centrally apertured support wall 13 therebetween, and the shoulders 10 have been provided with light passages 14 cooperating with the chamber 12. Hollow bushings 15 are press-fitted into the passages 14 to provide support for three adjustable mounting legs 16 for each of the mirrors 2. Each bushing 15 is internally threaded to receive an appropriate filter 17.

The mounting for the prism 4 and chopper grid 5 comprises a cylindrical sleeve 18 adjustably threaded into a supporting member 19 which, in turn, is supported by the wall 13 within the chamber 11. The prism 4, which may be cemented to an externally threaded washer 20, is adjustably positioned within the cylindrical sleeve 18. The sleeve 18 is provided with an aperture 21 arranged to cooperate with the light passage 14, thus permitting light to reach the prism 4 from the mirrors 2. The chopper grid 5 may be threaded or otherwise fixed into position, as shown, between the prism 4 and the Ramsden lens 6. With this arrangement it is apparent that the position of the prism 4 can be adjusted independently by axially moving it within the sleeve 18, or the positions of both the grid 5 and the prism 4 may be adjusted simultaneously by axially moving the entire sleeve. For permitting the necessary adjustments, slots for spanner or Allen-type wrenches appropriately may be provided in the washer 20 and the sleeve 18.

The entire assembly, including mirrors 1 and 2, prism 4 and grid 5, all secured to the spin assembly mounting 8, is rotatably mounted in the gimbal ring 22. The gimbal ring 22 is provided with two oppositely-disposed bores, a first supporting sleeve 23 being securely fitted in one bore and a second supporting sleeve 24 being supported in the opposite bore. The outer surfaces of sleeves 23 and 24 and the surfaces surrounding the chambers 11 and 12 are provided with cooperating shoulders for suitably supporting the inner and outer races of sets of ball bearings 26 and 27, respectively, thereby providing a substantially frictionless bearing support for the spinning assembly. A spin motor 28 is fixedly mounted within the sleeve 23, its shaft 29 being coupled to the wall 13 by means of a collar 30 and a T-key 31, as shown, or by any other suitable means. It will be seen that energization of the motor 28 will cause spinning of the mirror 1 on the ball bearings 26 and 27, and on the sleeves 23 and 24 to provide the required spin.

In addition to providing support for the bearings 27, the sleeve 24 also supports the Ramsden lens assembly 6, the infrared cell 7 and a shutter mechanism. The Ramsden lens assembly 6 is provided with a mounting having external threads for threading into the reduced sleeve end portion 24a adjacent the chopper grid 5.

Figure 2:
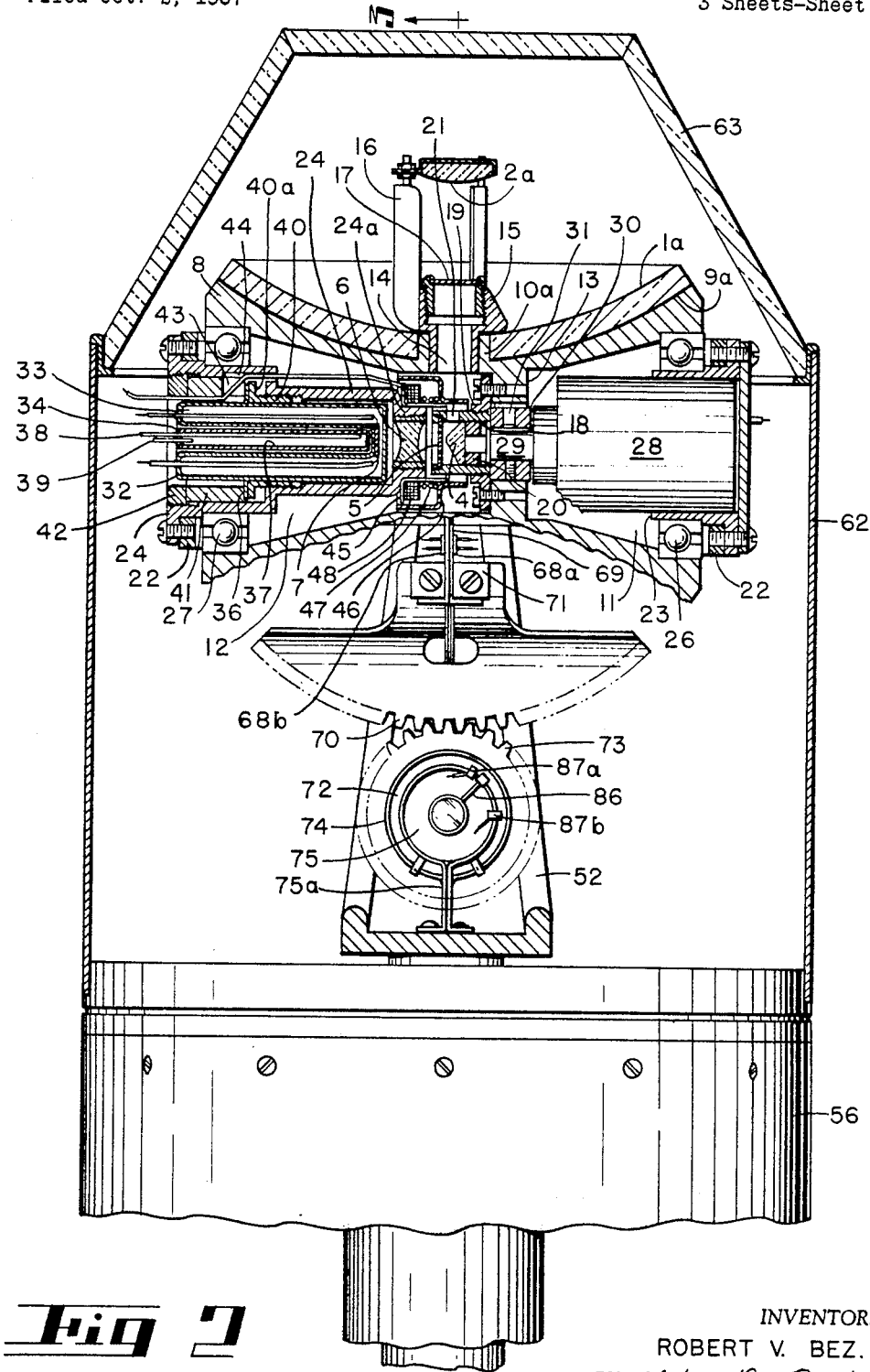
FIG. 2 is a top view of the invention, partly in section.

As best seen in FIG. 2, the mounting for the infrared cell 7 comprises a double-walled container 32 constructed in a manner very similar to that of the Dewar flask and, thus, defining an annular chamber 33 and a cylindrical chamber 34. The infrared cell 7 is cemented or otherwise secured to the inner wall and within the chamber 33 in proximity to the Ramsden lens 6. The electric leads from the infrared cell 7 are led out through the opposite end, and the chamber 33 is then evacuated and sealed in a manner well known in the art. An integral flange 36 is provided for mounting the assembly in a manner hereinafter to be described.

A refrigerating flask 37 having a compressed gas inlet 38 and an expanded gas outlet 39 is disposed within the cylindrical chamber 34, the gas inlet 38 being located in proximity to the cell 7. The expansion of the gas as it passes into the flask 37 through the inlet 38 provides the necessary refrigeration for the cell 7. Preferably, an inert gas is used, so that when it escapes from the flask 37 through the outlet 39 the metal mirrors will not be tarnished.

The entire mounting for the infrared cell 7 is positioned within the sleeve 24 where the flange 36 abuts an externally threaded nut 40 having a shoulder 40a. To adjust the position of the infrared cell relative to the Ramsden lens 6, the nut 40 may be threaded into or out of the sleeve 24; to lock the cell into position, a washer 41 abuts the opposite side of the flange 36 and is locked by an externally threaded nut 42. For the purpose of permitting the passage of electric leads to the shutter mechanism, the washer 41 and the sleeve 24 are provided with cooperating passages 43 and 44.

Figure 4:
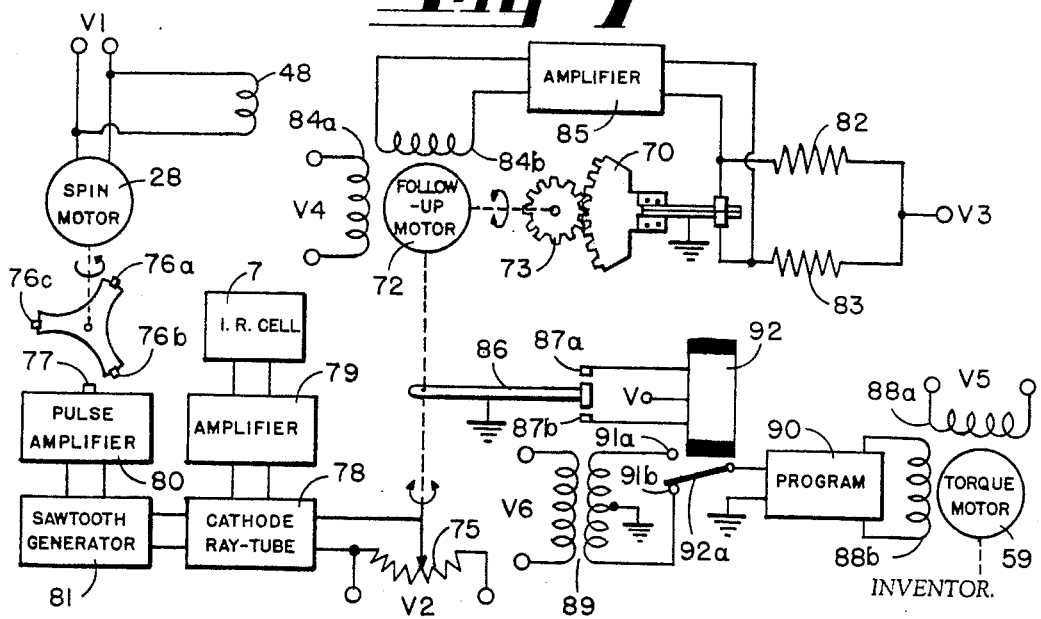
FIG. 4 is a schematic representation of the electrical control system utilized in accordance with the invention.

The shutter mechanism comprises a stationary bearing member 45, press-fitted or otherwise fixed on the outside of the reduced sleeve portion 24a, and a shutter member 46 made of a magnetic material and mounted for axial movement on the bearing member 45. Normally the shutter 46 is urged into the position shown by means of a spring 47, thereby blocking transmission of light through the light passage 14 to the prism 4. A shutter solenoid 48 is fixedly mounted on the bearing member 45 and, when energized by an appropriate power source, it operates to attract the shutter member 46, thereby permitting the passage of light to the prism 4 and thence to the cell 7. As seen in FIG. 4, the shutter solenoid 48 is connected across the spin motor 28 and, thus, is energized only when the assembly is spinning. This arrangement serves to protect the cell 7 from strong radiation except when the system is actually in use. The filter 17 is designed to exclude undesired radiation wavelengths, and is peaked at the target wavelengths.

As seen most clearly in FIGS. 1 and 3, the gimbal ring 22 is rotatably supported from a yoke 52 by means of the shafts 53 journaled in the arms of the yoke and by means of ball bearings 54 mounted in the gimbal ring 22 in suitable races. The yoke 52 is, in turn, fixed on a torque shaft 55 which is supported from fixed aircraft structure 56 by means of a bearing support member 57 and ball bearings 58. A reversible torque motor 59 (preferably an induction motor), fixedly supported on the aircraft structure 56, is coupled to the torque shaft 55 in any convenient manner. It is emphasized that the torque motor 59 does not serve to rotate the shaft 55, but merely applies a periodically reversible, programmed torque. Although the position of the armature of the torque motor 59 fixes the position of the shaft 55 in space, it is noted that shaft 55 is free of aircraft structure. Thus, as the aircraft rolls, the shaft 55 remains stationary.

The entire optical head is provided with a suitable enclosure, including a lower portion 62 and a transparent head portion 63 secured to the bearing support member by means of the flanged support 64. For the purpose of minimizing optical corrections, all the surfaces of the cover are flat. In addition, for reducing resistance caused by escaping gas from the flask 37, a pump (not shown) may be mounted on the aircraft structure 56 for providing a partial vacuum within the enclosure.

In the operation of the optical system as thus far described, it is seen that energization of the spin motor causes rotation of the spinning assembly (including the mirrors 1 and 2, the prism 4 and the chopper grid 5) in the gimbal ring 22. Advantageously, the lens 6 and the cell 7 are fixed with respect to the gimbal ring 22 and, hence, slip rings for the electric leads and complicated connections for the refrigeration tubing 38 and 39 are not required. Furthermore, the mounting arrangement permits independent as well as simultaneous adjustment of the various optical elements and, hence, the system may be adjusted very precisely.

As previously indicated, energization of the spin motor 28 causes rotation of the optical assembly at a high rate of speed and, because the optical head has considerable mass it becomes, in effect, a gyroscope. As is well known in the art, when a torque is applied to a rotating body on an axis at right angles to the axis of rotation, there results an angular motion about a third mutually perpendicular axis. This angular motion is known as precession. Thus, in the embodiment illustrated, if a clockwise torque is applied to the shaft 55, the optical assembly and the gimbal ring 22 will rotate, or precess, on the shafts 53 in one direction, while a counter-clockwise torque will cause precession in the opposite direction. For this purpose, means are provided for reversibly energizing the torque motor 59, thereby applying torque to the shaft 55, first in one direction and then in the opposite direction. By properly programming energization of the reversible torque motor 59, the rotation or precession of the gimbal ring 22 and the rotating assembly on the shafts 53 may be accomplished through a predetermined angle and at a desired rate. In a preferred embodiment the apparatus is mounted on an aircraft so that the spinning axis, i.e., the axis of rotation of the optical assembly on the supporting sleeves 23 and 24 in the gimbal ring 22, is horizontal in normal flight and so that the torque shaft 55 is parallel to the line of flight. Thus, the spinning of the optical assembly provides a vertical sweep, and the precession of the gimbal ring 22 produces horizontal scan.

Since the optical assembly is stationary on the roll axis (the torque shaft 55 is stationary in space as the aircraft rolls), and since the assembly is free on the yaw axis (the scan axis), the assembly is fully stabilized on two axes. In addition, the assembly is stable on the pitch axis (the spin axis) for short-term angular movements. For complete space stabilization it is necessary only that the pitch axis be stabilized for long-term angular movements as when the aircraft goes into a long dive.

The system as described to this point is adequate for many purposes; however, some inaccuracies in scanning are introduced because of the fact that considerable friction is introduced by the many lead wires and refrigeration tubing. In order to avoid these inaccuracies I provide strain gauges 68a and 68b supported on a folded flexible member 69 fixed at one end of the gimbal ring 22 and at the other end to a sector gear 70 by means of clamps 71. The sector gear 70 is, in turn, coupled to a reversible follow-up motor 72 by means of a gear 73, and the follow-up motor 72 is supported on the yoke 52 by means of a suitable bracket 74.

All wiring from the elements mounted on the gimbal ring 22 and refrigeration inlet tubing 38 is passed between the folds of the flexible member 69 and firmly secured in intimate relationship therebetween by means of the clamps 71. From there the wiring is led out of the assembly through apertures in the sector gear 70, the yoke 52 and the aircraft structure 56 to appropriate control and indicating circuits. When a torque is applied to the shaft 55 of the yoke 52 and the optical head begins to precess, the wiring and tubing tend to resist, and this resistance is reflected as a strain in the flexible member 69 and in the strain gauges 68a and 68b. By appropriate circuitry hereinafter to be described, the strain gauges 68 cause energization of the follow-up motor 72 in a direction which will tend to relieve the strain. Thus, the use of the strain gauges 68, in conjunction with the follow-up motor 72, eliminates precessing errors due to the physical resistance of the wires and tubing.

For the purpose of providing a precise position follower, a potentiometer 75, mounted on the yoke 52 by means of a bracket 75a, is coupled to the shaft of the follow-up motor 72. It is noted that the follow-up motor 72 does no work in connection with the driving of the optical head on the spin axis or the precessing on the scan axis, but merely drives the gears 70 and 73 to relieve the tension due to the wires and tubing. Thus, additional loading on this motor will have no torque-loading effect on the gimbal ring 22. However, because the follow-up motor must follow the precessing motion on order to relieve all strain due to wiring, etc., its shaft will always yield precise horizontal position information.

For the purpose of deriving vertical position information, I provide three small magnets 76a, 76b and 76c spaced 120° apart on the periphery of the spin assembly mounting 8 between the mirrors 1. In addition, I fixedly suspend a magnetic pickup coil 77 from the gimbal ring 22. The magnetic pickup coil 77 is so positioned that the magnets 76 will pass in proximity thereto at the instant one mirror is entering the field of search and the next mirror is leaving the field of search. Each time a magnet 76 passes in proximity to the pickup coil 77 a pulse is produced which, by means of appropriate circuitry, may be used to initiate a sweep for a visual indicating instrument, such as a cathode-ray tube.

For an understanding of the control circuitry, reference should now be made to the block diagram of the system in FIG. 4. For providing a visual display of detected infrared targets, I provide a cathode-ray tube 78 having vertical and horizontal deflection plates and an intensity control grid. When no target radiation is intercepted by the mirrors 1 there is no output from the infrared cell 7, and the control grid of the cathode-ray tube 78 is biased beyond cutoff. However, when an infrared cell 7 signal is present and amplified in an amplifier 79 and then applied to the control grid of the cathode-ray tube 78, a luminosity is produced on the face of the tube.

For the purpose of determining the location of the detected target, I synchronize the vertical deflection of the cathode-ray beam with the operation of the spin motor 28, and I synchronize the horizontal deflection plates with the operation of the potentiometer 75 as actuated by follow-up motor 72. The spin motor 28 is energized from any convenient source V1 and is designed to run in one direction at a predetermined, relatively high rate of speed. As previously indicated, the spin motor is coupled by means of its shaft 29 to the spin assembly mounting 8 in which the small magnets 76a, 76b and 76c have been spaced 120° apart. When a magnet 76 passes in proximity to the pickup coil 77 fixedly mounted on the gimbal ring 22, a pulse is produced which is then amplified in a pulse amplifier 80. The output from pulse amplifier 80 is then applied to the sync input of a conventional saw-tooth wave generator 81, the output of which is coupled to the vertical deflection plates of the cathode-ray tube 78. With this arrangement, the cathode-ray beam will begin a vertical sweep on the face of the cathode-ray tube each time a magnet 76 passes the pickup coil 77. Since this event coincides with the time that a mirror 1 is entering the field of search and the next mirror 1 is leaving the field, the vertical sweep of the cathode-ray beam across the face of the cathode-ray tube coincides with the vertical sweep of the mirrors 1a, 1b and 1c.

As previously explained, the horizontal scan of the optical assembly is produced by applying a programmed, reversible torque by means of the torque motor 59 to the yoke 52, thereby producing precession of the optical assembly on the shafts 53. Although the follow-up motor 72 is not directly coupled to the shafts 53 or to the gimbal ring 22, it is arranged so that it precisely follows its movement. A convenient voltage source V2 is connected across the input to the potentiometer 75, and its output is applied to the horizontal deflection plates of the cathode-ray tube 78. In this way the horizontal beam of the cathode-ray tube 78 is deflected in accordance with the position of the shaft of motor 72.

For the purpose of controlling the direction of energization of the follow-up motor 72 and, hence, the position of the potentiometer tap, I provide a servo or follow-up loop, including the strain gauges 68a and 68b, which are connected in a conventional bridge circuit with fixed resistors 82 and 83. A suitable source of alternating current V3 is connected across the bridge input terminals, the motor winding 84a being connected across a suitable alternating current source V4, and the motor winding 84b being supplied with energization from the output of amplifier 85 which is connected across the output terminals of the bridge. The servo-loop is completed through the mechanical coupling between the shaft of the follow-up motor 72 and the strain gauges 68a and 68b; thus, when the yoke begins to precess, the flexible member 69 will bend, thereby producing compression in one of the strain gauges 68a or 68b and tension in the other.

This produces unbalance in the bridge and a resulting output current of a given phase which is amplified and applied through the winding 84b, thereby energizing the motor 72 in a given direction. When the precessing of the yoke reverses, the flexible member 69 bends in the opposite direction, thereby producing opposite strains and tensions in the strain gauges 68a and 68b to produce a current in the opposite phase and, thus, reversing the direction of energization of the motor 72. Since the motor shaft always turns in a direction tending to relieve the strain and tension on both gauges, i.e., rotation of the motor tends to straighten the flexible member 69, the motor 72 always follows the motion of the gimbal ring 22. Since the motor 72 is directly coupled to the potentiometer 75, it is readily apparent that the horizontal sweep of the cathode-ray tube 78 is synchronized with the position of the follow-up motor 72 and the gimbal ring 22.

For the purpose of controlling the operation of the torque motor 59, I mount a contact arm 86 on the shaft of the follow-up motor 72 in proximity to the bracket 75a of the potentiometer 75. In addition, I fixedly mount a pair of contacts 87a and 87b spaced apart a predetermined amount on the bracket 75a in position to cooperate with the contact arm 86 as it rotates. The spacing of the contacts 87a and 87b determines the amount of horizontal scan and, in my preferred embodiment, 60° is desirable although almost any degree of scan may be used up to 180° and the position of the contacts 87 may be adjustable.

As seen in FIG. 4, the winding 88a of the torque motor 59 is energized from any convenient alternating current source V5, while the winding 88b is energized by means of a transformer 89 and a programmer 90. The primary winding of transformer 89 is connected across a suitable source of alternating current V6, while the secondary is provided with a grounded center tap and a pair of output contacts 91a and 91b. Cooperating with the contacts 91a and 91b is an armature 92a of a polarized differential relay 92, the input of which is connected across the contacts 87a and 87b and supplied with a suitable source of direct current V7 at its center tap. The armature 92a is mechanically arranged so that it is in engagement with either contact 91a or 91b. Thus, when the source V6 is connected, the torque motor 59 is energized from across that portion of the secondary transformer 89 in circuit with the armature 92a. If the upper portion is connected in circuit (through contact 91a), then energization of motor 59 is in one direction; if the lower portion is connected in circuit (through contact 91b), then energization of motor 59 is in the opposite direction.

When the torque motor 59 is energized the spin assembly precesses as previously described, and the contact arm 86 is rotated so as to engage either the contact 87a or the contact 87b, depending on the direction of rotation. At this time the differential relay 92 is momentarily energized in a given direction to drive the armature 92a form one contact 91 to the other. This results in a phase reversal of the voltage from the transformer 89, thereby reversing the direction of torque of motor 59 and a reversal in the direction of precession. Thus, the current through the winding 88b supplied from the transformer 89 and through the programmer 90 will be first in one phase and then in the opposite phase, thereby reversing the torque motor 59 each time the contact arm 86 touches either the contacts 87a or 87b.

As is well known in the art, if a fixed amount of torque is applied to the shaft 55 the spinning assembly will not precess at a fixed rate, but will vary in relation to the position of the assembly on the precessing axis (the scan axis). In order to maintain a constant rate of precession (or scan) the current through the winding 88b must be programmed to compensate for the change in position of the precessing assembly, and for this purpose I provide a programmer 90. The programmer 90 modifies the wave form of the output of transformer 89 to produce the amount of current necessary to furnish the required torque at every degree of precession, and it may comprise any conventional wave-shaping circuit suitable for this purpose.

Having described a preferred embodiment of my invention, what I now claim is:

1. An optical detector comprising a system of optics for producing images of targets in space, means mounting said system of optics on a first shaft; means mounting said first shaft on a first support for rotation on a first axis; means mounting said first support on a second shaft; means mounting said second shaft on a second support for rotation on a second axis perpendicular to said first axis; means for rotating said system of optics on said first axis at a high rate of speed; and means for applying a periodically reversible torque to said second support about a third axis perpendicular to said second axis, whereby said system of optics reversibly precesses on said second axis.

2. The invention as defined in claim 1 wherein are provided means for measuring torque on said second axis in opposition to precession; and means for relieving said torque on said second axis.

3. The invention as defined in claim 1 wherein said means for rotating said system of optics and said means for applying a periodically reversible torque include electromotive devices supplied with electric current through a plurality of electric current-carrying wires; and wherein said torque in opposition to said precession is due to tension in said electric wires, and wherein said relieving means comprises a motor mechanically coupled to said second axis by said wires, and wherein said motor is energized in response to the tension in said wires in a direction to relieve said tension.

4. An optical detector comprising: a gimbal ring; a plurality of optical image focusing devices rotatably mounted in said gimbal ring in fixed space relationship on a spin axis, each of said optical image focusing devices being adapted to sweep in turn a predetermined sector in space; a yoke; means mounting said gimbal ring in said yoke for rotation on a scan axis at right angles to said spin axis; motor means mounted on said gimbal ring for rotating said optical image focusing devices at a high rate of speed; and means for applying a periodically reversible torque to said yoke about an axis perpendicular to said scan axis for causing said gimbal ring and said optical image focusing devices to precess on said scan axis.

5. The invention as defined in claim 4 wherein said motor is mounted on said spin axis.

6. The invention as defined in claim 4 wherein is provided a photoelectric cell; means for directing focused images from said image focusing systems to said photoelectric cell, said photoelectric cell having electric wires for transmitting electric indications to a remote station and wherein said motor means is supplied with energization through electric wires from a distant source of energy; and means for relieving the torque on said gimbal ring due to said wires.

7. The invention as defined in claim 6 wherein said torque-relieving means comprises: a motor mounted on said yoke; a strain gauge in intimate engagement with said wires and coupled to the shaft of said motor; and means responsive to strain in said strain gauge for energizing said motor in a direction to relieve said strain.

8. The invention as defined in claim 6 wherein said torque-relieving means comprises: an electric motor mounted on said yoke; an elongated, flexible support member coupled at one of its ends to the shaft of said motor and at its other end to said gimbal ring; said wiring being in intimate engagement with said flexible support member; a strain gauge mounted on said flexible support member whereby the resistance of said wiring to the precessing of said yoke will result in a flexing of said flexible support member and a strain in said strain gauge; and means responsive to strain in said strain gauge for energizing said motor in a direction to relieve said strain.

9. An infrared detector comprising: a yoke fixed on a torque shaft; a gimbal ring mounted in said yoke for rotation on a scan axis perpendicular to the axis of said torque shaft; an optical assembly for focusing images of targets in space, means mounting said optical assembly in said gimbal ring for rotation on a spin axis perpendicular to said scan axis, said mounting means for said optical assembly comprising first and second hollow bearing members fixedly disposed on said gimbal ring at opposite ends of said spin axis, said optical assembly being rotatably mounted on the outer surface of said bearing member; an infrared detector fixed within one of said bearing members; means included in said optical assembly for directing focused images onto said infrared detector; a motor fixed within the other of said bearing members, said motor having a rotor coupled to said optical assembly whereby energization of said motor causes rapid rotation of said assembly on said spin axis; and means for applying a periodically reversible torque about the axis of said torque shaft whereby said assembly will reversibly precess on said scan axis.

10. The invention as defined in claim 9 wherein said infrared detector and said motor are provided with electric wires connected to remote stations, and wherein means are provided for relieving the torque on said scan axis due to the physical resistance of said wires.

11. The invention as defined in claim 10 wherein said torque-relieving means comprises: a motor mounted on said yoke; an elongated, flexible support member, said wires being mounted in intimate engagement with said flexible support member whereby tension or compression in said wires is transmitted to said flexible support member; means connecting said support member between the shaft of said motor and said gimbal ring; means for detecting the tension and compression in said flexible support member caused by said wiring; and electric circuit means responsive to said detected tension and compression for energizing said motor in a direction to reduce said tension and compression.

12. The invention as defined in claim 11 wherein said means for detecting tension and compression comprises strain gauges mounted in intimate engagement with said flexible support member.

13. A detector comprising: a system for focusing radiant energy; means mounting said system for rotation on a first axis and on a second axis at right angles to said first axis; means for rotating said system on said first axis at a high rate of speed; and means applying a periodically reversible torque to said system about a third axis perpendicular to said second axis, thereby causing said system to precess on said second axis.

14. The invention as defined in claim 13 wherein means are provided for measuring torque on said second axis in opposition to precession, and means are provided for relieving said torque on said second axis.

15. The invention as defined in claim 14 wherein said means for rotating said system and said means applying a periodically reversible torque include electromotive devices supplied with electric current through a plurality of electric current-carrying wires; and wherein said torque in opposition to said precession is due to tension in said electric wires, and wherein said relieving means comprises a motor mechanically coupled to said second axis by said wires and wherein said motor is energized in response to the tension in said wires in a direction to relieve said tension.

16. A detector comprising: a gimbal ring; a plurality of radiant energy-focusing means mounted in said gimbal ring in fixed phase relationship on a spin axis, each of said radiant energy-focusing means being adapted to sweep in turn a predetermined sector in space; a yoke; means mounting said gimbal ring in said yoke for rotation on a scan axis at right angles to said spin axis; motor means mounted on said gimbal ring for rotating said plurality of radiant energy-focusing means at a high rate of speed; and means for applying torque to said yoke along an axis perpendicular to said scan axis for causing said gimbal ring and said radiant energy-focusing means to precess on said scan axis.

17. The invention as defined in claim 16 wherein means are provided for measuring torque on said scan axis in opposition to precession, and means for relieving said torque on said scan axis.

References Cited

UNITED STATES PATENTS

| 2,945,414 | 7/1960 | Blackstone. | |
| 2,720,643 | 10/1955 | Hays | 343—765 XR |
| 2,554,119 | 5/1951 | Perham | 343—765 |

WALTER STOLWEIN, Primary Examiner

U.S. Cl. X.R.

250—203, 236